United States Patent
Zhou

(10) Patent No.: US 9,612,098 B2
(45) Date of Patent: Apr. 4, 2017

(54) RULER

(71) Applicant: BOE TECHNOLOGY GROUP CO., LTD., Beijing (CN)

(72) Inventor: Weifeng Zhou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 245 days.

(21) Appl. No.: 14/422,857

(22) PCT Filed: May 27, 2014

(86) PCT No.: PCT/CN2014/078531
§ 371 (c)(1),
(2) Date: Feb. 20, 2015

(87) PCT Pub. No.: WO2015/074398
PCT Pub. Date: May 28, 2015

(65) Prior Publication Data
US 2016/0047642 A1 Feb. 18, 2016

(30) Foreign Application Priority Data
Nov. 19, 2013 (CN) .......................... 2013 1 0585667

(51) Int. Cl.
*G01B 3/10* (2006.01)
*G09F 9/30* (2006.01)
*G09F 9/35* (2006.01)

(52) U.S. Cl.
CPC .......... *G01B 3/1061* (2013.01); *G01B 3/1082* (2013.01); *G09F 9/301* (2013.01); *G09F 9/35* (2013.01); *G01B 2003/1069* (2013.01)

(58) Field of Classification Search
CPC ................ G01B 3/1061; G01B 3/1082; G01B 2003/1069
(Continued)

(56) References Cited

U.S. PATENT DOCUMENTS

2014/0109424 A1* 4/2014 Leff .......................... G01B 1/00
33/701
2016/0021732 A1* 1/2016 Zhou ..................... G02F 1/1333
361/749

(Continued)

FOREIGN PATENT DOCUMENTS

CN 1269009 A 10/2000
CN 201955032 U 8/2011
(Continued)

OTHER PUBLICATIONS

1st office action issued in Chinese application No. 201310585667.8 dated Oct. 14, 2015.
(Continued)

*Primary Examiner* — Yaritza Guadalupe-McCall
(74) *Attorney, Agent, or Firm* — Nath, Goldberg & Meyer; Joshua B. Goldberg

(57) ABSTRACT

The present invention relates to the field of measurement technology, and provides a ruler which can solve the problem that the existing ruler has few kinds of scales and monotonous display content. The ruler of the present invention comprises a strip-like body for performing measurement, the strip-like body is a display screen, and the ruler further comprises a circuit unit, which is connected to the display screen and is used for driving the display screen to display. The ruler provided by the present invention can display rich measurement information when measuring an object.

10 Claims, 2 Drawing Sheets

(58) Field of Classification Search
USPC .......................................................... 33/755
See application file for complete search history.

(56) References Cited

U.S. PATENT DOCUMENTS

| | | | |
|---|---|---|---|
| 2016/0047642 A1* | 2/2016 | Zhou | G09F 9/301 33/760 |
| 2016/0187929 A1* | 6/2016 | Kim | G06F 1/1652 345/184 |

FOREIGN PATENT DOCUMENTS

| | | |
|---|---|---|
| CN | 202281571 U | 6/2012 |
| CN | 203012296 U | 6/2013 |
| CN | 103245261 A | 8/2013 |
| CN | 103337222 A | 10/2013 |
| CN | 103595856 A | 2/2014 |
| CN | 103615944 A | 3/2014 |
| GB | 2286677 A | 8/1995 |
| GB | 2312510 A | 10/1997 |
| JP | 0192601 A | 11/1989 |

OTHER PUBLICATIONS

English Translation of Written Opinion of PCT/CN2014/078531 from ISR dated May 27, 2014 that was originally provided to the USPTO on Feb. 20, 2015 with the application.
"What's New", 4-7 pgs., dated Aug. 2012, 1994-2015 China Academic Journal Electronic Publishing House, http://www.enki.net, (cited in 1st Chinese office action).
International Search Report dated May 27, 2014 corresponding to application No. PCT/CN2014/078531.

* cited by examiner

RULER

This is a National Phase Application filed under 35 U.S.C. 371 as a national stage of PCT/CN2014/078531, filed May 27, 2014, an application claiming the benefit of Chinese Application No. 201310585667.8, filed Nov. 19, 2013, the content of each of which is hereby incorporated by reference in its entirety.

FIELD OF THE INVENTION

The present invention relates to the field of measurement technology, and particularly relates to a ruler.

BACKGROUND OF THE INVENTION

Tape measure, as a type of ruler, is a commonly used measuring tool. The tape measure is widely used in various fields of industrial production, and is also a must-have tool for households. A main type of tape measure is steel tape measure, followed by fiber tape measure which is generally called leather tape. Generally speaking, current tape measures have only one or two kinds of scales and unvaried appearance.

Rapid development of display technology has been achieved in recent ten years, and particularly, flexible display technology is considered to bring revolutionary advancement. A flexible display screen adopting the flexible display technology has characteristics of softness, ultra-thinness, bendability and foldability, and thereby has a wider range of application.

Inventors found that at least the following problems exist in the prior art: with respect to the existing tape measure, the scales for measuring have few kinds and are unchangeable, which results in less information and monotonous content shown by the tape measure.

SUMMARY OF THE INVENTION

The technical problem to be solved by the present invention includes providing a ruler which is provided with various kinds of scales and can display rich content, in view of the problem that the existing ruler has few kinds of scales and monotonous display content.

A technical solution used to solve the technical problem of the present invention is a ruler comprising a strip-like body for performing measurement, the strip-like body is a display screen, and the ruler further comprises a circuit unit, which is connected to the display screen and is used for driving the display screen to display.

Preferably, the display screen is a flexible display screen.

Preferably, the flexible display screen comprises an array substrate, on which a gate driving circuit is provided.

Preferably, the flexible display screen is a flexible liquid crystal display screen, and a surface opposite to a display surface thereof is provided with a ferromagnetic metal foil, which is connected to a common electrode of the flexible liquid crystal display screen.

Preferably, a surface opposite to a display surface of the flexible display screen is provided with a ferromagnetic metal foil, the ruler further comprises a housing used for accommodating the strip-like body that coils, an opening for leading out the strip-like body is provided on the housing, and a magnetic block is provided at the opening on the housing.

Preferably, the ruler further comprises a housing used for accommodating the strip-like body that coils, an opening for leading out the strip-like body is provided on the housing, a magnetic block is provided at the opening on the housing, and metal wiring of the flexible display screen contains nickel or cobalt metal therein.

Preferably, the ruler further comprises a housing, on which an opening for leading out the strip-like body is provided, and a mechanical rotation-stopping mechanism, which is used for stopping the strip-like body from rotating, is provided at the opening on the housing.

Preferably, wherein the circuit unit comprises a flexible printed circuit board, and a fixing jig is provided at a connecting part of the flexible display screen and the flexible printed circuit board.

Preferably, a hook is provided at a tail end of the strip-like body.

Preferably, the circuit unit comprises a flexible printed circuit board, a system circuit board and an input module, one end of the flexible printed circuit board is connected to the strip-like body, and the other end thereof is connected to the system circuit board, the input module is connected to the system circuit board and is used for inputting user instructions and providing the input user instructions to the system circuit board, and the system circuit board is used for making the flexible printed circuit board drive the strip-like body to display measurement information according to the input user instructions.

The strip-like body of the ruler provided by the present invention is a display screen, and is driven by a circuit unit to display, and therefore, the ruler of the present invention can use various kinds of scales, meet requirements of different conditions, and display rich measurement information.

Figure 1:
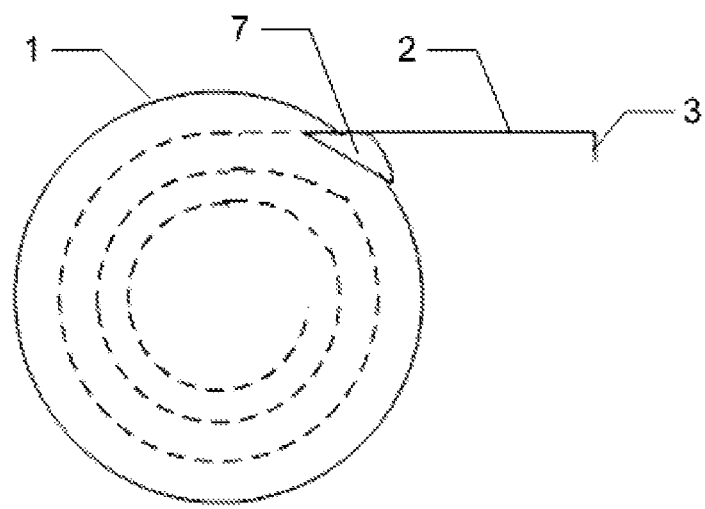
FIG. 1 is a schematic diagram of a structure of a ruler according to Embodiment 1 of the present invention.

Reference numerals: 1, housing; 2, strip-like body; 3, hook; 4, flexible printed circuit board; 5, fixing jig; 6, system circuit board; 7, magnetic block; 8, ferromagnetic metal foil.

DETAILED DESCRIPTION OF THE EMBODIMENTS

To enable those skilled in the art to better understand the technical solutions of the present invention, the present invention will be further described in detail below in conjunction with the accompanying drawings and the specific implementations.

Embodiment 1

Figure 2:
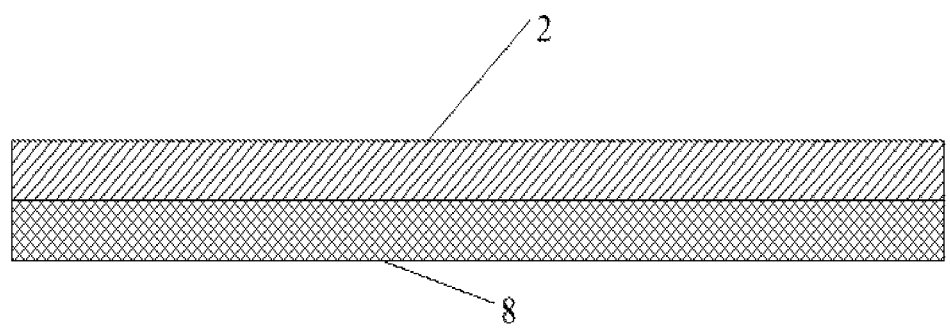
FIG. 2 is a schematic diagram of structures of a strip-like body and a ferromagnetic metal foil of the ruler according to Embodiment 1 of the present invention.
Figure 3:
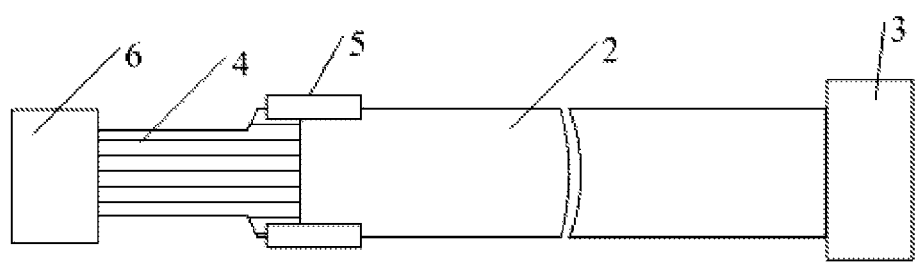
FIG. 3 is a schematic diagram of structures of a flexible display screen and a flexible printed circuit board of the ruler according to Embodiment 1 of the present invention.

The present embodiment provides a ruler which, as shown in FIGS. 1 to 3, comprises a strip-like body 2 for performing size measurement on an object to be measured, and the strip-like body 2 is a display screen. The ruler further comprises a circuit unit and a power supply unit, the circuit unit is used for driving the display screen serving as the strip-like body 2 to display measurement information such as a scale whose minimum unit may be millimeter, cun, inch or the like. The circuit unit comprises a flexible printed circuit board 4 and a system circuit board 6, one end of the flexible printed circuit board 4 is connected to the strip-like body 2, and the other end thereof is connected to the system circuit board 6. The flexible printed circuit board 4 is a connecting lead part of the display screen serving as the strip-like body 2 and the system circuit board 6, may include a starting circuit or a driving chip thereon and is used for providing display signals and control signals to the display screen serving as the strip-like body 2. The power supply unit is connected with the strip-like body 2, and the flexible printed circuit board 4 and the system circuit board 6 in the circuit unit, respectively, and is used for supplying power to the display screen serving as the strip-like body 2, the flexible printed circuit board 4 and the system circuit board 6.

In the ruler provided by the present embodiment, the strip-like body 2 is a display screen and is driven by the circuit unit to display measurement information, so that the display screen serving as the strip-like body 2 can display various kinds of scales to meet measurement requirements in different conditions and further to display rich measurement information. Preferably, the circuit unit further comprises an input module (not shown in FIGS. 1 to 3), which is connected to the system circuit board 6 and is used for inputting user instructions and providing the input user instructions to the system circuit board 6. The system circuit board 6 is further used for making the flexible printed circuit board 4 drive the display screen serving as the strip-like body 2 to display measurement information according to the input user instructions. For example, if the user instruction is to instruct the strip-like body 2 to simultaneously display multiple kinds of scales, the strip-like body 2 is driven to simultaneously display these kinds of scales; if the user instruction is to instruct the strip-like body 2 to display a certain scale (e.g., the minimum unit thereof is millimeter), the strip-like body 2 is driven to display the certain kind of scale. The input module may be implemented in a form of push-button or touch screen. In use, scales in different units can be switched according to the input user instructions, so that the display screen serving as the strip-like body 2 can display different contents.

Further, in measurement, the ruler may make the display screen serving as the strip-like body 2 display a length conversion table for different kinds of scales, a prompt message and the like (which may be pre-stored in the system circuit board 6); or the ruler may perform calculation of relative length (such as the number of times that a length is as long as one's palm length, the calculation function of relative length is implemented by the system circuit board 6, and the calculation result is displayed by the display screen serving as the strip-like body 2); or, in measurement, the ruler may make displayed content of the display screen serving as the strip-like body 2 function as decoration and the like (data of the displayed content may also be pre-stored in the system circuit board 6).

It should be noted that, the display screen serving as the strip-like body 2 may be a flexible display screen, or a hard screen. The flexible display screen has characteristics of ultra-thinness, softness, bendability and foldability. When the display screen serving as the strip-like body 2 is the flexible display screen, the ruler is equivalent to a tape measure commonly used in our daily life, which is soft and bendable or foldable; when the display screen serving as the strip-like body 2 is the hard screen, the ruler is equivalent to a plate ruler commonly used in our daily life, which is not bendable nor foldable.

Preferable, the strip-like body 2 is the flexible display screen.

When the flexible display screen is used as the strip-like body 2, a gate driving chip generally needs to be provided. In normal conditions, since the strip-like body 2 is long in length and narrow in width, it is difficult to arrange the gate driving chip along a long side of the strip-like body 2 (i.e., flexible display screen). In addition, even if the gate driving chip can be arranged at the long side of the strip-like body 2, bendability of the strip-like body 2 will be affected. Undoubtedly, the gate driving chips may be collectively arranged at a short side of the strip-like body 2, and may be connected to gates of the flexible display screen serving as the strip-like body 2 through gate lines, so as to meet the requirements for bendability and foldability, but in this case, part of gate lines in the flexible display screen serving as the strip-like body 2 may be too long, which lowers drive capacity of the flexible display screen.

To solve the above problem, further preferably, the flexible display screen serving as the strip-like body 2 comprises an array substrate provided with the gate driving circuit, and specifically, comprises an array substrate based on row driving technique (Gate driver On array, GOA), so as to improve integration of the flexible display screen serving as the strip-like body 2. In this way, there is no need to provide a separate gate driving chip any more, and thus the flexible display screen serving as the strip-like body 2 becomes lighter, thinner and more flexible.

Preferable, the flexible display screen serving as the strip-like body 2 is a flexible liquid crystal display screen, and a surface opposite to a display surface (i.e., a surface for displaying measurement information) is provided with a ferromagnetic metal foil 8, which, as shown in FIG. 2, is connected to a common electrode of the flexible liquid crystal display screen. When the flexible liquid crystal display screen serves as the strip-like body 2, since the strip-like body 2 is generally long, delay of a common electrode signal of the flexible liquid crystal display screen serving as the strip-like body 2 is serious. However, by connecting the ferromagnetic metal foil 8 with the common electrode of the flexible liquid crystal display screen, the delay of the common electrode signal can be reduced.

Needless to say, the flexible display screen is not limited to the flexible liquid crystal display screen, but may be in other forms such as a flexible organic light emitting diode (OLED) display screen.

Preferably, fixing jigs 5 may be provided at a connecting part of the flexible display screen serving as the strip-like body 2 and the flexible printed circuit board 4, as shown in FIG. 3. For example, the fixing jig 5 may be a magnetic sticker, and the connecting part may also be reinforced by ways of being bonded with an adhesive, or being clamped with a clip. The flexible display screen serving as the strip-like body 2 and the flexible printed circuit board 4 are generally connected by an anisotropic conductive film, and after the connecting part thereof is provided with the fixing jigs 5 to be reinforced, stress on the anisotropic conductive film can be reduced, thus improving bonding strength between the flexible printed circuit board 4 and the flexible display screen serving as the strip-like body 2.

The ruler provided by the present embodiment is bendable when the strip-like body 2 adopts a flexible display screen, and the strip-like body 2 may coil to be accommodated in a housing, so as to form a tape measure, as shown in FIG. 1. A rotation-stopping mechanism of the tape measure in the present embodiment may adopt the following implementations, which are described in detail below.

Preferably, a first rotation-stopping mechanism is the one in which the ferromagnetic metal foil 8 (which preferably is electrically connected to the common electrode) is provided on the surface opposite to the display surface of the flexible display screen serving as the strip-like body 2, an opening for leading out the strip-like body 2 is provided on the housing 1, one end of the strip-like body 2 may extend out of the opening, and a magnetic block 7 is provided at the opening on the housing 1, as shown in FIG. 1. When the one end of the strip-like body 2 extends out of the opening to a position that meets a measuring length, the magnetic block 7 and the ferromagnetic metal foil 8 may be attracted together by a magnetic force produced therebetween, thus achieving the purpose of stopping and locating.

Size measurement can be performed by pulling the strip-like body 2 out of the housing 1, and when it is required to read measurement information, the magnetic force produced between the magnetic block 7 and the ferromagnetic metal foil 8 can prevent a portion of the strip-like body 2 having extended out of the opening on the housing 1 from retracting into the housing 1, resulting in that the measurement information are read more accurately and easily in measurement. With such rotation-stopping mechanism, damage caused by a mechanical fixing means to the flexible display screen serving as the strip-like body 2 can be avoided, and packaging effect of the flexible display screen serving as the strip-like body 2 can be enhanced.

Preferably, the second rotation-stopping mechanism is the one in which an opening for leading out the strip-like body 2 is also provided on the housing 1, one end of the strip-like body 2 may extend out of the opening, an magnetic block 7 is provided at the opening on the housing 1, the housing 1 is made of non-ferromagnetic material, metal wiring of the flexible display screen serving as the strip-like body 2 is doped with nickel or cobalt metal, and the metal wiring may comprise gate lines, data lines, common electrode lines and the like, as long as a magnetic force can be produced between an area of the display screen serving as the strip-like body 2 and the magnetic block 7. When the one end of the strip-like body 2 extends out of the opening to a position that meets a measuring length, the magnetic block 7 and nickel or cobalt metal in the metal wiring may be attracted together by a magnetic force produced therebetween, thus achieving the purpose of stopping and locating, and facilitating reading the measurement information in measurement.

Preferably, the third rotation-stopping mechanism is a mechanical rotation-stopping mechanism in which, specifically, an opening for leading out the strip-like body 2 is also provided on the housing 1, one end of the strip-like body 2 may extend out of the opening, and a mechanical positioning device, which is used for preventing a portion of the strip-like body 2 having extended out of the opening on the housing 1 from retracting into the housing 1 when reading the measurement information, is provided at the opening on the housing 1. Specifically, the mechanical rotation-stopping mechanism may adopt a mechanical slot-type structure, namely, the strip-like body 2 is pressed by a movable slider so as to be fixed. Undoubtedly, it should be understood that, there are many known structures for fixing the strip-like body 2 to the housing 1, which are not described in detail herein.

Preferably, in the present embodiment, a hook 3 is riveted to a tail end of the strip-like body 2 of the ruler. In this way, in measurement, the hook 3 can hook an edge of the object to be measured to facilitate size measurement and allow the measurement information to be read more accurately and more easily.

Apparently, the ruler in the present embodiment may be manufactured by adopting different materials, process parameters and apparatuses according to different requirements. In addition, a flexible display product of a different shape may be formed by adopting a flexible display screen of a different shape in combination with a circuit unit, for example, a portable product such as a roll up banner or the like may be formed.

It can be understood that, the above implementations are merely exemplary implementations used for explaining the principle of the present invention, but the present invention is not limited thereto. For those skilled in the art, various modifications and improvements may be made without departing from the spirit and essence of the present invention, and these modifications and improvements are also deemed as falling within the protection scope of the present invention.

The invention claimed is:

1. A ruler, comprising a strip-like body for performing measurement, wherein, the strip-like body is a display screen, and the ruler further comprises a circuit unit, which is connected to the display screen and is used for driving the display screen to display.

2. The ruler according to claim 1, wherein, the display screen is a flexible display screen.

3. The ruler according to claim 2, wherein, the flexible display screen comprises an array substrate, on which a gate driving circuit is provided.

4. The ruler according to claim 2, wherein, the flexible display screen is a flexible liquid crystal display screen, and a surface opposite to a display surface thereof is provided with a ferromagnetic metal foil, which is connected to a common electrode of the flexible liquid crystal display screen.

5. The ruler according to claim 2, wherein, a surface opposite to a display surface of the flexible display screen is provided with a ferromagnetic metal foil, the ruler further comprises a housing for accommodating the strip-like body which coils, an opening for leading out the strip-like body is provided on the housing, and a magnetic block is provided at the opening on the housing.

6. The ruler according to claim 2, wherein, the ruler further comprises a housing for accommodating the strip-like body which coils, an opening for leading out the strip-like body is provided on the housing, a magnetic block is provided at the opening on the housing, and metal wiring of the flexible display screen contains nickel or cobalt metal therein.

7. The ruler according to claim 2, wherein, the ruler further comprises a housing, on which an opening for leading out the strip-like body is provided, and a mechanical rotation-stopping mechanism, which is used for stopping the strip-like body from rotating, is provided at the opening on the housing.

8. The ruler according to claim 2, wherein, the circuit unit comprises a flexible printed circuit board, and a fixing jig is provided at a connecting part of the flexible display screen and the flexible printed circuit board.

9. The ruler according to claim 2, wherein, a hook is provided at a tail end of the strip-like body.

10. The ruler according to claim 1, wherein, the circuit unit comprises a flexible printed circuit board, a system circuit board and an input module, one end of the flexible printed circuit board is connected to the strip-like body, and the other end thereof is connected to the system circuit board, the input module is connected to the system circuit board and is used for inputting user instructions and providing the input user instructions to the system circuit board, and the system circuit board is used for making the flexible printed circuit board drive the strip-like body to display measurement information according to the input user instructions.

* * * * *